US012585699B2

(12) United States Patent

Hu et al.

(10) Patent No.: US 12,585,699 B2
(45) Date of Patent: Mar. 24, 2026

(54) SYSTEM, METHOD, AND COMPUTER PROGRAM FOR MULTIMODAL VIDEO RETRIEVAL

(71) Applicant: SAMSUNG ELECTRONICS CO., LTD., Suwon-si (KR)

(72) Inventors: Zhiming Hu, Vaughan (CA); Ning Ye, Toronto (CA); Iqbal Ismail Mohomed, Markham (CA); Salar Hosseini Khorasgani, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 57 days.

(21) Appl. No.: 18/428,626

(22) Filed: Jan. 31, 2024

(65) Prior Publication Data

US 2024/0370491 A1     Nov. 7, 2024

Related U.S. Application Data

(60) Provisional application No. 63/463,136, filed on May 1, 2023.

(51) Int. Cl.
| | |
|---|---|
| *G06F 16/74* | (2019.01) |
| *G06F 16/71* | (2019.01) |
| *G06F 16/738* | (2019.01) |
| *G06N 3/0499* | (2023.01) |
| *G06V 10/776* | (2022.01) |
| *G06V 10/82* | (2022.01) |

(Continued)

(52) U.S. Cl.
CPC ............ *G06F 16/743* (2019.01); *G06F 16/71* (2019.01); *G06F 16/738* (2019.01); *G06N 3/0499* (2023.01); *G06V 10/776* (2022.01);

*G06V 10/82* (2022.01); *G06V 10/945* (2022.01); *G06V 20/46* (2022.01); *G06V 20/48* (2022.01)

(58) Field of Classification Search
None
See application file for complete search history.

(56) References Cited

U.S. PATENT DOCUMENTS

| | | | |
|---|---|---|---|
| 9,830,503 B1 * | 11/2017 | Martin ................... | G06V 20/52 |
| 2016/0070962 A1 | 3/2016 | Shetty et al. | |
| 2016/0378863 A1 | 12/2016 | Shlens et al. | |

(Continued)

FOREIGN PATENT DOCUMENTS

KR      10-2023-0114156 A      8/2023

OTHER PUBLICATIONS

International Search Report (PCT/ISA/210) and Written Opinion (PCT/ISA/237) issued by the International Searching Authority on Jun. 27, 2024 in corresponding International Application No. PCT/KR2024/003781.

*Primary Examiner* — Richard L Bowen
(74) *Attorney, Agent, or Firm* — Sughrue Mion, PLLC

(57)     ABSTRACT

Provided are system, method, and device for performing multimodal video retrieval. According to embodiments, the method may include: obtaining a first plurality of frames of a video; selecting a second plurality of frames from among the first plurality of frames using a frame selection module, wherein a number of the second plurality of frames may be less than a number of the first plurality of frames; determining a representation of the video based on the selected second plurality of frames using a neural network model; and storing the representation of the video in a memory.

20 Claims, 9 Drawing Sheets

(51) Int. Cl.
  *G06V 10/94*    (2022.01)
  *G06V 20/40*    (2022.01)

(56)          References Cited

U.S. PATENT DOCUMENTS

| | | | |
|---|---|---|---|
| 2017/0109584 A1* | 4/2017 | Yao ..................... | H04N 21/4666 |
| 2019/0005334 A1* | 1/2019 | Grundmann ......... | G06V 10/771 |
| 2019/0377955 A1* | 12/2019 | Swaminathan .. | H04N 21/23418 |
| 2021/0049353 A1 | 2/2021 | Bian et al. | |
| 2021/0150249 A1* | 5/2021 | Zheng .................. | G06V 10/761 |
| 2021/0182566 A1 | 6/2021 | Jung | |
| 2021/0342642 A1* | 11/2021 | Shabtay .............. | G06F 18/2115 |
| 2022/0207875 A1 | 6/2022 | Kopparapu et al. | |
| 2022/0256175 A1 | 8/2022 | Jain et al. | |

* cited by examiner

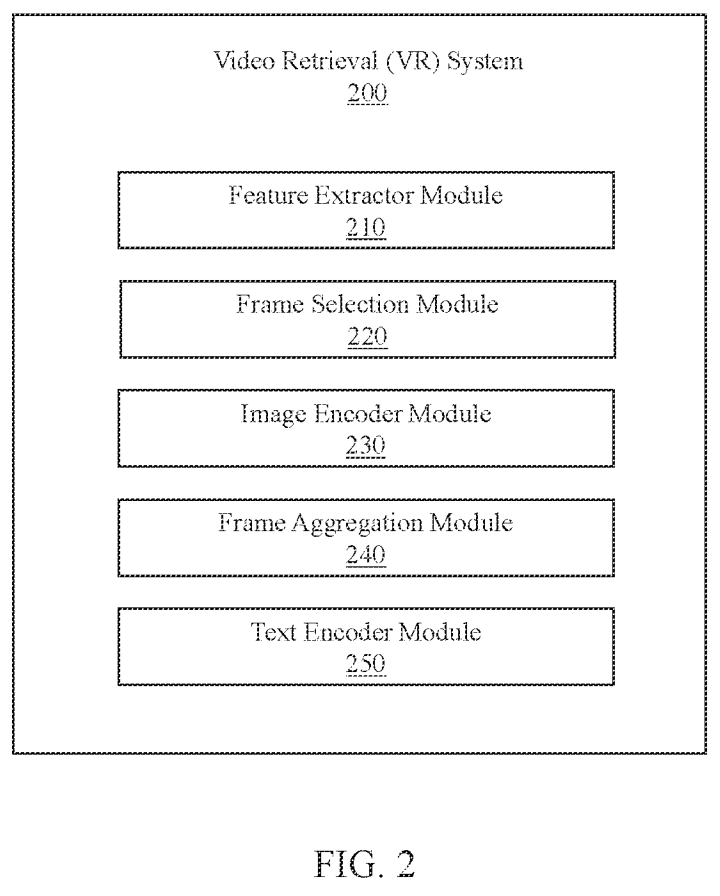

Video Retrieval (VR) System
200

Feature Extractor Module
210

Frame Selection Module
220

Image Encoder Module
230

Frame Aggregation Module
240

Text Encoder Module
250

FIG. 2

Start

Obtain a first plurality of frames of a video
S410

Select a second plurality of frames from among the first plurality of frames
using a frame selection module
S420

Determine a representation of the video based on the selected second plurality
of frames using a neural network model
S430

Store the representation of the video
S440

End

400

Start

Receive a text from a user
S510

Determine a representation of the text
S520

Determine a similarity score
S530

Retrieve a video with highest similarity score
S540

End

500

Start

Obtain a first plurality of frames from a video
S610

Determine a first feature of each of the first plurality of frames
S620

Determine a first score of each of the first plurality of frames
S630

Select a second plurality of frames from the first plurality of frames
S640

End

600

SYSTEM, METHOD, AND COMPUTER PROGRAM FOR MULTIMODAL VIDEO RETRIEVAL

CROSS REFERENCE TO RELATED APPLICATIONS

This application claims priority from U.S. Provisional Patent Application No. 63/463,136, filed with the United States Patent and Trademark Office on May 1, 2023, the disclosure of which is incorporated herein by reference in its entirety.

TECHNICAL FIELD

Systems, methods, and computer programs consistent with example embodiments of the present disclosure relate to a multimodal video retrieval.

BACKGROUND

Multimodal video retrieval has attracted growing attention for its potential to be applied in various applications. Multimodal video retrieval may refer to a process to search and retrieve videos using natural language queries, such as "find a video where my dog is running in a park" or "find a video of my child in a birthday party".

Some image-based machine learning models, such as Contrastive Language-Image Pretraining (CLIP), may be used to perform multimodal video retrieval. CLIP is an image-text model that is pre-trained based on a large amount of web image and text data, which allows for its representations to cover an expansive domain of objects, relationships, and scenes. In particular, in order to retrieve a video using CLIP (which is an image-based machine learning model), frames or images from a video may need to be sampled, and features of such frames may need to be analyzed to form a representation of the video.

Frame selection may refer to a process to sample and select frames from a video. Some frame selection methods may use a frame-agnostic sampling approach such as uniform sampling, in which a certain number of evenly spaced frames are selected from a video. This approach allows for a simple and flexible selection of frames, because the number of selected frames can be easily controlled while having a wide coverage over the entire video. However, because the frame-agnostic sampling approach simply selects evenly spaced frames, there may be a case where uninformative frames (blurry and/or empty frames) are selected, which may introduce undesirable artifacts to the training of the model, and may unnecessarily waste computational resources, leading to sub-optimal retrieval performance. In order to address the above issues, methods utilizing learning-based approach may be used for frame selection; where only informative frames are selected from a video, which may reduce undesirable artifacts and improve computational resource usage.

Frame aggregation may refer to a process to aggregate features of frames of a video to form a representation of a video. Some frame aggregation methods may use a query-dependent aggregation approach in which features of the frames (e.g., embeddings) may be aggregated for every video in real time on the fly (or online). However, because the features are aggregated for every video in real time on the fly, the amount of time for retrieving the video may be long, and index size may be large. In order to address the above issues, some frame aggregation methods may use a query-independent aggregation approach such as mean aggregation and transformer-based self-attention, in which features may be aggregated for every video in advance, and may then be cached for use at a later time (or offline), which may reduce retrieval time and index size.

Nevertheless, the above methods for frame selection and frame aggregation may have at least the following shortcomings.

For example, some frame selection methods using the learning-based approach only allow for one frame to be selected per video, or only allow for a fixed proportion of input frames to be selected at a time. As such, these methods may be inflexible in view of variability in available computational resources at different time slots on the same device, or across different devices on which an application is targeted.

Further, some frame aggregation methods may aggregate the features of the frame equally. However, not all frames may be equally important. Further, if the number of frames to be aggregated is too large, there may be a larger number of less important frames included in comparison to a smaller number of more important frames. As such, these frame aggregation methods may provide a representation of a video that does not capture important content of the video.

SUMMARY

Example embodiments of the present disclosure may dynamically perform multimodal video retrieval, while filtering out uninformative frames and improving flexibility, retrieval latency, and performance.

According to embodiments, a method is provided. The method may include: obtaining a first plurality of frames of a video; selecting a second plurality of frames from among the first plurality of frames using a frame selection module, wherein a number of the second plurality of frames may be less than a number of the first plurality of frames; determining a representation of the video based on the selected second plurality of frames using a neural network model; and storing the representation of the video in a memory.

According to embodiments, the number of the second plurality of frames may be selected based on at least one from among a user input and an amount of resources available.

According to embodiments, the frame selection module may include at least one neural network model, and the frame selection module may be end-to-end differentiable.

According to embodiments, the second plurality of frames may be selected using a mask, and the mask may include a function that is configured to prevent a selected frame from being re-selected when selecting the second plurality of frames.

According to embodiments, the neural network model may include a multilayer perceptron (MLP) neural network model.

According to embodiments, the selecting the second plurality of frames may include calculating a tensor having a shape of $[b, k, n]$, where $b$ represents a batch size, $k$ represents the number of the second plurality of frames, and $n$ represents the number of the first plurality of frames.

According to embodiments, the selecting the second plurality of frames may include: determining a first feature of each of the first plurality of frames; determining a first score of each of the first plurality of frames based on the first feature; and selecting the second plurality of frames from the first plurality of frames based on the first score using a mask.

According to embodiments, each of the first plurality of frames may have a selection likelihood which is proportional to the first score, and the second plurality of frames may be selected based on a multinomial distribution and the selection likelihood.

According to embodiments, the determining the representation of the video may include: determining a second feature of each of the second plurality of frames; determining a second score of each of the second plurality of frames based on the second feature using the neural network model; and determining the representation of the video based on the second score.

According to embodiments, the second feature may have a weight proportional to the second score; and the representation of the video may be determined by determining a weighted mean of second features of the second plurality of frames.

According to embodiments, the second feature may be determined using a Contrastive Language-Image Pretraining (CLIP) model.

According to embodiments, a system is provided. The system may include: a memory storage storing computer-executable instructions; and at least one processor communicatively coupled to the memory storage, wherein the at least one processor may be configured to execute the instructions to: obtain a first plurality of frames of a video; select a second plurality of frames from among the first plurality of frames using a frame selection module, wherein a number of the second plurality of frames may be less than a number of the first plurality of frames; determine a representation of the video based on the selected second plurality of frames using a neural network model; and store the representation of the video in the memory.

According to embodiments, the number of the second plurality of frames may be selected based on at least one from among a user input and an amount of resources available for the system.

According to embodiments, the frame selection module may include at least one neural network model, and the frame selection module may be end-to-end differentiable.

According to embodiments, the second plurality of frames may be selected using a mask, and the mask may include a function that is configured to prevent a selected frame from being re-selected when selecting the second plurality of frames.

According to embodiments, the neural network model may include a multilayer perceptron (MLP) neural network model.

According to embodiments, the at least one processor may be configured to execute the instructions to select the second plurality of frames by: determining a first feature of each of the first plurality of frames; determining a first score of each of the first plurality of frames based on the first feature; and selecting the second plurality of frames from the first plurality of frames based on the first score using a mask.

According to embodiments, the at least one processor may be configured to execute the instructions to determine the representation of the video by: determining a second feature of each of the second plurality of frames; determining a second score of each of the second plurality of frames based on the second feature using the neural network model; and determining the representation of the video based on the second score.

According to embodiments, the second feature may have a weight proportional to the second score; and the representation of the video may be determined by determining a weighted mean of second features of the second plurality of frames.

According to embodiments, a non-transitory computer-readable recording medium is provided. The non-transitory computer-readable recording medium may have recorded thereon instructions executable by at least one processor of a system to cause the at least one processor to perform a method including: obtaining a first plurality of frames of a video; selecting a second plurality of frames from among the first plurality of frames using a frame selection module, wherein a number of the second plurality of frames may be less than a number of the first plurality of frames; determining a representation of the video based on the selected second plurality of frames using a neural network model; and storing the representation of the video in a memory.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 2 illustrates a block diagram of example components in a VR system, according to one or more embodiments;

DETAILED DESCRIPTION

Figure 1:
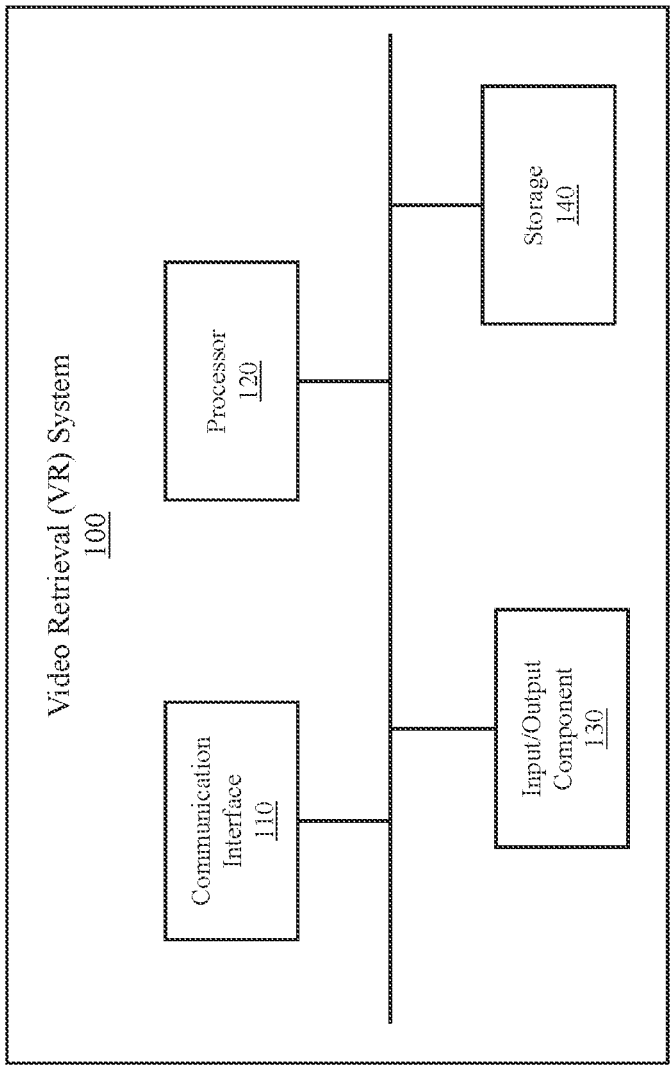
FIG. 1 illustrates a block diagram of example components in a Video Retrieval (VR) system, according to one or more embodiments.

The following detailed description of example embodiments refers to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the threshold tuning system of the present disclosure, according to one or more embodiments, are provided in the following.

FIG. 1 illustrates a block diagram of example components in a Video Retrieval (VR) system 100, according to one or more embodiments.

The VR system may include a system, a platform, a module, or the like, which may be configured to perform one or more operations or actions for retrieving video. According to embodiments, the VR system 100 may be, or may be included in, a device. For example, the VR system 100 may be included in a mobile device such as a smart phone, a television (TV), tablet, a smart vacuum cleaner, augmented reality glasses, virtual reality glasses, a smart refrigerator, and the like.

It may be understood that some of the devices, which the VR system 100 may be utilized in, may have different capabilities and available computational resources. For example, a smart refrigerator may be more resource constrained and/or have less available computational resource in comparison to a smart phone. Further, the device itself may have different available computational resource at different times. For example, a smart vacuum cleaner may have more available computational resources when idling and on standby in comparison to when performing a cleaning operation.

As illustrated in FIG. 1, the VR system 100 may include at least one communication interface 110, at least one processor 120, at least one input/output component 130, and at least one storage 140, although it can be understood that the VR system 100 may include more or less components than as illustrated in FIG. 1, and/or the components may be arranged in a manner different from FIG. 1, without departing from the scope of the present disclosure.

The communication interface 110 may include at least one transceiver-like component (e.g., a transceiver, a separate receiver and transmitter, a bus, etc.) that enables the components of the VR system 100 to communicate with each other and/or to communicate with one or more components external to the VR system 100, such as via a wired connection, a wireless connection, or a combination of wired and wireless connections.

For example, the communication interface 110 may couple the processor 120 to the storage 140 to thereby enable them to communicate and to interoperate with each other in performing one or more operations. As another example, communication interface 110 may couple the VR system 100 (or one or more components included therein), so as to enable them to communicate and to interoperate with each other.

According to one or more embodiments, the communication interface 110 may include one or more application programming interfaces (APIs) which allow the VR system 100 (or one or more components included therein) to communicate with one or more software applications.

The input/output component 130 may include at least one component that permits the VR system 100 to receive information and/or to provide output information. It can be understood that, in some embodiments, the input/output component 130 may include at least one input component (e.g., a touch screen display, a button, a switch, a microphone, a sensor, etc.) and at least one output component (e.g., a display, a speaker, one or more light-emitting diodes (LEDs), etc.), each of which may be separated from each other.

The storage 140 may include one or more storage mediums suitable for storing data, information, and/or computer-executable instructions therein. According to embodiments, the storage 140 may include at least one memory storage, such as a random access memory (RAM), a read only memory (ROM), and/or another type of dynamic or static storage device (e.g., a flash memory, a magnetic memory, and/or an optical memory) that stores information and/or instructions for use by the processor 120. Additionally or alternatively, the storage 140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 140 may be configured to store information, such as raw data, metadata, or the like. Additionally or alternatively, the storage 140 may be configured to store one or more information associated with one or more operations performed by the processor 120. For example, the storage 140 may store information defining the historical operation(s) performed by the processor 120 to retrieve video, one or more results of operations performed by the processor 120, or the like. Further, the storage 140 may store data or information required in retrieving video. For example, the storage 140 may store at least one representation of a video (described below with reference to FIG. 4).

In some implementations, the storage 140 may include a plurality of storage mediums, and the storage 140 may be configured to store a duplicate or a copy of at least a portion of the information in the plurality of storage mediums, for providing redundancy and for backing-up the information or the associated data. Furthermore, the storage 140 may also store computer-readable or computer-executable instructions which, when being executed by one or more processors (e.g., processor 120), causes the one or more processors to perform one or more actions/operations described herein.

The processor 120 may include at least one processor capable of being programmed or being configured to perform a function(s) or an operation(s) described herein. For example, the processor 120 may be configured to execute computer-executable instructions stored in at least one storage medium or a memory storage (e.g., storage 140, etc.) to thereby perform one or more actions or one or more operations described herein.

According to embodiments, the processor 120 may be configured to receive (e.g., via the communication interface 110, via the input/output component 130, etc.) one or more signals and/or one or more user inputs defining one or more instructions for performing one or more operations. Further, the processor 120 may be implemented in hardware, firmware, or a combination of hardware and software. For example, processor 120 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 120 may be configured to collect, to extract, and/or to receive one or more information (in the form of signal or data, etc.), and to process the received one or more information to thereby retrieve video.

Descriptions of several example operations which may be performed by the processor 120 of the VR system 100 for retrieving video are provided below with reference to FIG. 4 to FIG. 8.

FIG. 2 illustrates a block diagram of example components in a VR system 200, according to one or more embodiments. The VR system 200 may correspond to the VR system 100 in FIG. 1, thus the features associated with the VR system 100 and the VR system 200 may be similarly applicable to each other, unless being explicitly described otherwise.

As illustrated in FIG. 2, the VR system 200 may include at least one feature extractor module 210, at least one frame selection module 220, at least one image encoder module 230, at least one frame aggregation module 240, and at least one text encoder module 250, although it can be understood that the VR system 200 may include more or less components than as illustrated in FIG. 2, and/or may be arranged in a manner different from as illustrated in FIG. 2, without departing from the scope of the present disclosure.

According to embodiments, the feature extractor module 210 may be configured to obtain one or more frames of a video, and extract or otherwise determine one or more features from the one or more frames of the video. It may be understood that a feature of a frame may include an embedding, a representation, and the like, which may be a set of data that capture important information of the frame. For example, a feature of a frame may include a set of data that corresponds to a visual feature that is representative of such frame. According to embodiments, the feature extractor module 210 may include one or more components for obtaining the one or more frames and for extracting the one or more features. According to embodiments, the feature extractor module 210 may include a neural network model for extracting the one or more features. According to embodiments, the neural network model may be frozen, such that weights of a neural network layer are prevented from being modified during a backward pass of training. According to embodiments, the neural network model may include a lightweight Convolutional Neural Network (CNN) neural network model. For example, the feature extractor module 210 may include a MobileNet model.

According to embodiments, the frame selection module 220 may be configured to determine a score for the one or more frames of the video, and select one or more frames from the obtained one or more frames of the video based on the score. According to embodiments, the frame selection module 220 may include one or more components for determining the score and for selecting the one or more frames. Acceding to embodiments, the frame selection module 220 may include at least one neural network model. For example, the frame selection module 220 may include a Transformation Block, Linear Selection Network, Hard-Top K Operator, and the like. According to embodiments, the frame selection module may be end-to-end differentiable.

According to embodiments, the image encoder module 230 may be configured to extract (or determine) one or more features from the selected one or more frames of the video. According to embodiments, the image encoder module 230 may include one or more components for extracting the one or more features. According to embodiments, the image encoder module 230 may include a pre-trained encoder. According to embodiments, image encoder module 230 may include an encoder that has a higher performance and is more computationally intensive (heavyweight) in comparison to the feature extractor module 210, such that features extracted by the image encoder module 230 capture more fine-grained semantics (e.g., better representative of the frame) in comparison to features extracted by the feature extractor module 210. For example, the image encoder module 230 may include a Pre-Trained Contrastive Language-Image Pretraining (CLIP) Image Encoder, which may be trained based on a substantial amount of image and text data, and which may generate a representation which can capture more fine-grained semantics in comparison to, for example, MobileNet.

According to embodiments, the frame aggregation module 240 may be configured to determine a score for the selected one or more frames of the video, and determine a representation of the video based on the score. It may be understood that a representation of a video may include an embedding and the like, which may be a set of data that capture important information of the video. According to embodiments, the frame aggregation module 240 may include one or more components for determining the score and for determining the representation. According to embodiments, the frame aggregation module 240 may include a neural network model. According to embodiments, the frame aggregation module 240 may include a neural network model that is lightweight. For example, the frame aggregation module 240 may include a multilayer perceptron (MLP) neural network model, however embodiments are not limited thereto. For example, in some embodiments, the frame aggregation module 240 may include at least one from among a recurrent neural network (RNN) such as a Long Short-Term Memory (LSTM) model, a transformer, and any other model or algorithm that may be used to transform features. In some embodiments, one or more models used in the frame aggregation module 240 may not be a trained model.

According to embodiments, the text encoder module 250 may be configured to extract (determine) one or more features from one or more texts. It may be understood that a feature of a text may include an embedding, a representation, and the like, which capture important information of the text. It may also be understood that the text may refer to a natural language query. For example, the text may include "find a video where my dog is running in a park". According to embodiments, the text encoder module 250 may include one or more components for extracting the one or more features. According to embodiments, the text encoder module 250 may include an encoder.

Figure 3:
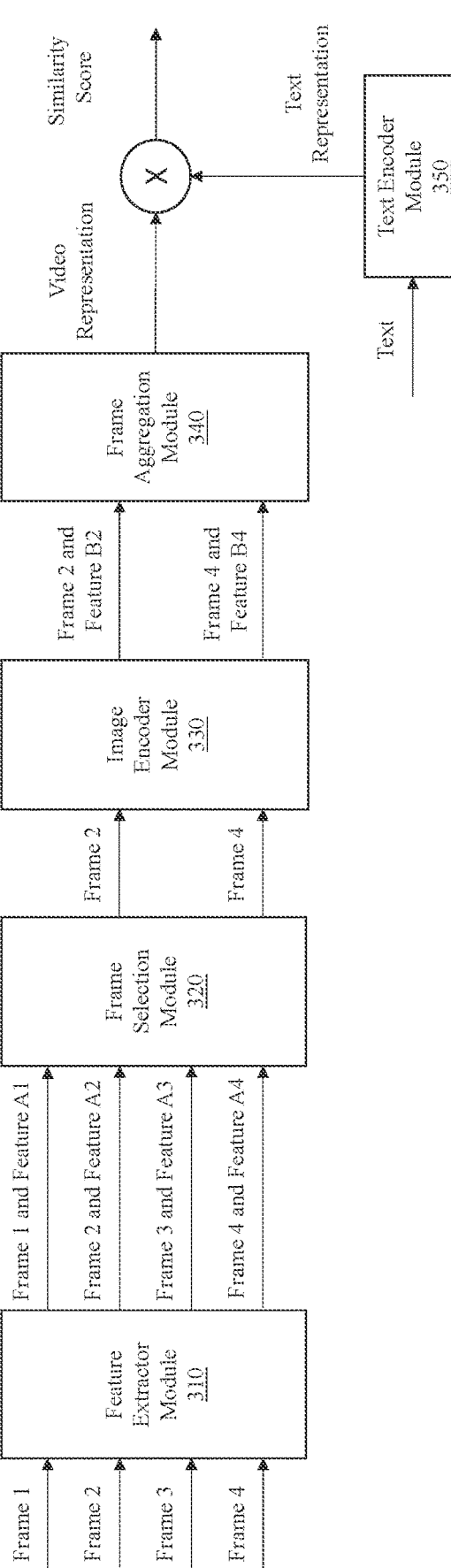
FIG. 3 illustrates an example of video retrieval, according to one or more embodiments.

FIG. 3 illustrates an example of video retrieval according to one or more embodiments.

As illustrated in FIG. 3, the video retrieval in the present disclosure may involve at least one feature extractor module 310, at least one frame selection module 320, at least one image encoder module 330, at least one frame aggregation module 340, and at least one text encoder module 350. The feature extractor module 310, frame selection module 320, image encoder module 330, frame aggregation module 340, and text encoder module 350 may respectively correspond to the feature extractor module 210, frame selection module 220, image encoder module 230, frame aggregation module 240, and text encoder module 250 in FIG. 2, thus the features associated with the above elements may be similarly applicable to each other, unless explicitly described otherwise.

The feature extractor module 310 may first obtain a first plurality of frames from a video. The first plurality of frames may have n number of frames. For example, as shown in FIG. 3, a video may contain 20 frames, and the feature extractor module 310 may obtain 4 frames: frame 1, frame 2, frame 3, and frame 4 from the video (i.e., n is 4). The feature extractor module 310 may then extract a feature of each of the first plurality of frames: feature A1 for frame 1, feature A2 for frame 2, feature A3 for frame 3, and feature A4 for frame 4.

Once the feature extractor module 310 has extracted a feature of each of the first plurality of frames, the frame selection module 320 may select a second plurality of frames from the first plurality of frames that are most important based on the associated features. The second plurality of frames may have k number of frames that is less than n. In embodiments, the number of the second plurality of frames (e.g., the number k of frames to be selected) can be adjusted. For example, as shown in FIG. 3, among the 4 frames obtained by the feature extractor module 310, some frames may be less important than others (e.g., blurry frame, empty frame, and the like). Accordingly, the frame selection module 320 may select 2 frames (i.e., k is 2) from the obtained 4 frames that are most important, namely frame 2 and frame 4.

Accordingly, the above process allows for uninformative frames (e.g., blurry frame, empty frame, and the like) to be filtered out to avoid introducing undesirable artifacts to the training of the model, as well as to avoid unnecessarily wasting computational resources on the uninformative frames.

After the frame selection module 320 has selected the second plurality of frames, the image encoder module 330 may extract a feature of each of the second plurality of frames. In this regard, because the image encoder module 330 may have a higher performance in comparison to the feature extractor module 310, features extracted by the image encoder module 330 capture more fine-grained semantics (i.e., better representative of the frame) in comparison to features extracted by the feature extractor module

310. For example, as shown in FIG. 3, image encoder module 330 may extract feature B2 for frame 2 and feature B4 for frame 4; where feature B2 is a better representative of frame 2 than feature A2, and feature B4 is a better representative of frame 4 than feature A4.

After the image encoder module 330 has extracted a feature of each of the second plurality of frames, the frame aggregation module 340 may combine the features of the second plurality of frames in order to obtain a representation of the video based on the features. The frame aggregation module 340 may weigh the feature for each of the second plurality of frames differently based on how important they are, and then combine the features based on such weights. For example, the image encoder module 330 may determine that frame 2 shows important elements and gives a high weight to frame 2, and may determine that frame 4 shows unimportant elements and gives a low weight to frame 4. Accordingly, the image encoder module 330 may determine a representation of the video based on feature B2 of frame 2 and feature B4 of frame 4 by calculating a weighted means between feature B2 and B4, where feature B2 has a higher weight and feature B4 has a lower weight.

Although FIG. 3 illustrates each of the feature extractor module 310 and the image encoder module 330 only extracting one feature for each frame for convenience of description, embodiments are not limited thereto. For example, in some embodiments, a plurality of features may be extracted for each frame.

After the representation of the video is obtained, the representation may be stored (or cached) in the memory of the VR system for use at a later time. In particular, at a later time, a user of the VR system may input a text for searching a video. In response, the text encoder module 350 may extract a feature of said text and obtain a representation of the text. Subsequently, the VR system may determine a similarity score between the representation of the text and each of the representations of the videos stored in the memory, and retrieve the video which has the highest score. It may be understood that the similarity score indicates how well the representation of the text matches the representation of the video. It may also be understood that the VR system may utilize various methodologies for determining the similarity score and selecting the video which has the highest score, such as nearest neighbor search, cosine similarity, and the like.

Accordingly, the above process may improve the retrieval latency between the time when the user provides the text input and the time when the user receives the video that best matches the text. In particular, because the representations of videos may be obtained and stored in advance, the retrieval latency may only include the time for obtaining a representation of the text (query encoding time), and the time for determining the similarity score and selecting the video which has the highest score.

Here it may be understood that, because the above process may filter out uninformative frames (i.e., blurry frame, empty frame, and the like) from a larger set of frames (first plurality of frames having n frames) using feature extractor module 310 that is lightweight, uninformative frames may be filtered out without spending a large amount of resource. Further, because the image encoder module 330 may extract features (which may be better representatives of the frame in comparison to the features extracted by the feature extractor module 310) from a smaller set of frames (e.g., a second plurality of frames having k frames), the proper representation of the video may be obtained without using a large amount of resources.

It may be understood that, while the above descriptions are provided in relation to offline video retrieval where representations of videos are obtained and stored ahead of time, the VR system may instead utilize online video retrieval where representations of videos are obtained in real time.

Below, several example operations performable by the VR system of the present disclosure are described with reference to FIG. 4 to FIG. 8.

Figure 4:
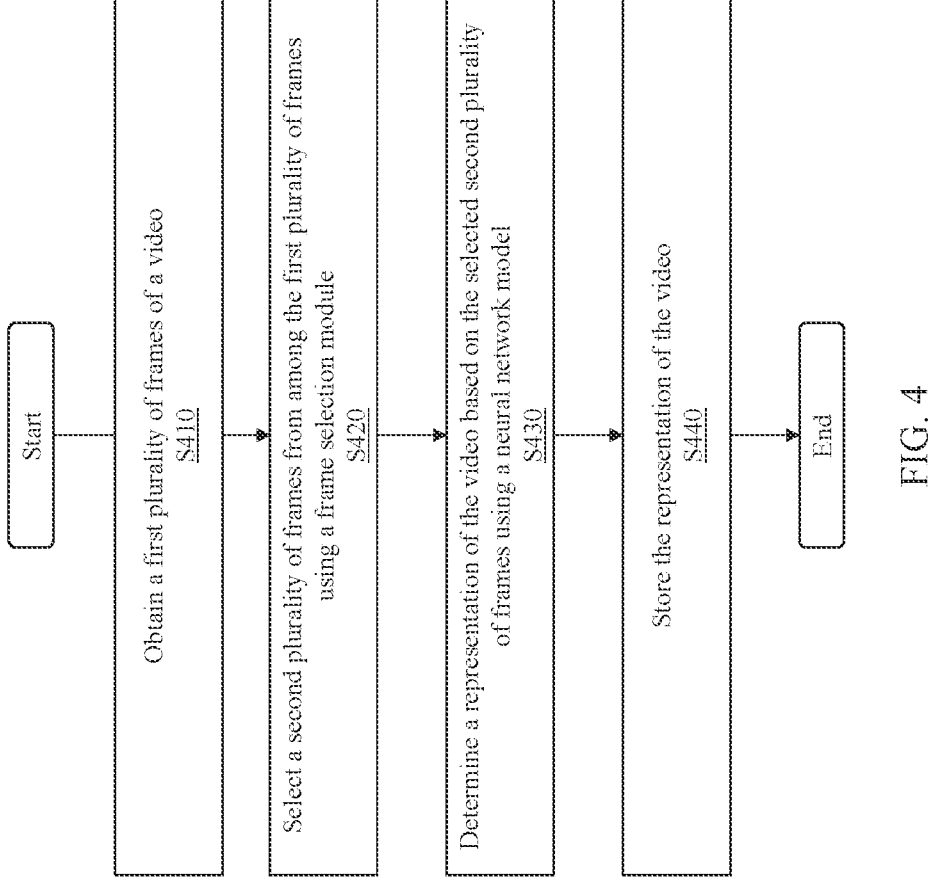
FIG. 4 illustrates a flow diagram of an example method for video retrieval, according to one or more embodiments.

FIG. 4 illustrates a flow diagram of an example method 400 for video retrieval, according to one or more embodiments. One or more operations in method 400 may be performed by at least one processor (e.g., processor 120) of the VR system.

As illustrated in FIG. 4, at operation S410, the at least one processor may be configured to obtain a first plurality of frames of a video.

At operation S420, the at least one processor may be configured to select a second plurality of frames from among the first plurality of frames. According to embodiments, the second plurality of frames may be selected from among the first plurality of frames using a frame selection module (e.g., one or more of the frame selection modules 220 and 320 discussed above). As such, it may be understood that a number of the second plurality of frames may be less than a number of the first plurality of frames. Examples of operations for obtaining the first plurality of frames and for selecting the second plurality of frames are described below with reference to FIG. 6 and FIG. 7.

At operation S430, the at least one processor may be configured to determine a representation of the video based on the selected second plurality of frames using a neural network model (e.g., a neural network module included in one or more of the frame aggregation modules 240 and 340 discussed above). It may be understood that the representation of the video may include an embedding and the like, which may be a set of data that capture important information of the video. Examples of operations for determining the representation of the video are described below with reference to FIG. 8.

At operation S440, the at least one processor may be configured to store the representation of the video in the memory of the VR system.

Upon performing operation S440, the method 400 may be ended or be terminated. In some embodiments, method 400 may return to operation S410, such that the at least one processor may be configured to repeatedly perform, for at least a predetermined amount of time, the obtaining the first plurality of frames (at operation S410), the selecting the second plurality of frames (at operation S420), the determining the representation (at operation S430), and the storing the representation (at operation S440). For example, the at least one processor may repeatedly perform the obtaining the first plurality of frames (at operation S410), the selecting the second plurality of frames (at operation S420), the determining the representation (at operation S430), and the storing the representation (at operation S440) for each of a plurality of videos stored in the memory of the system.

Figure 5:
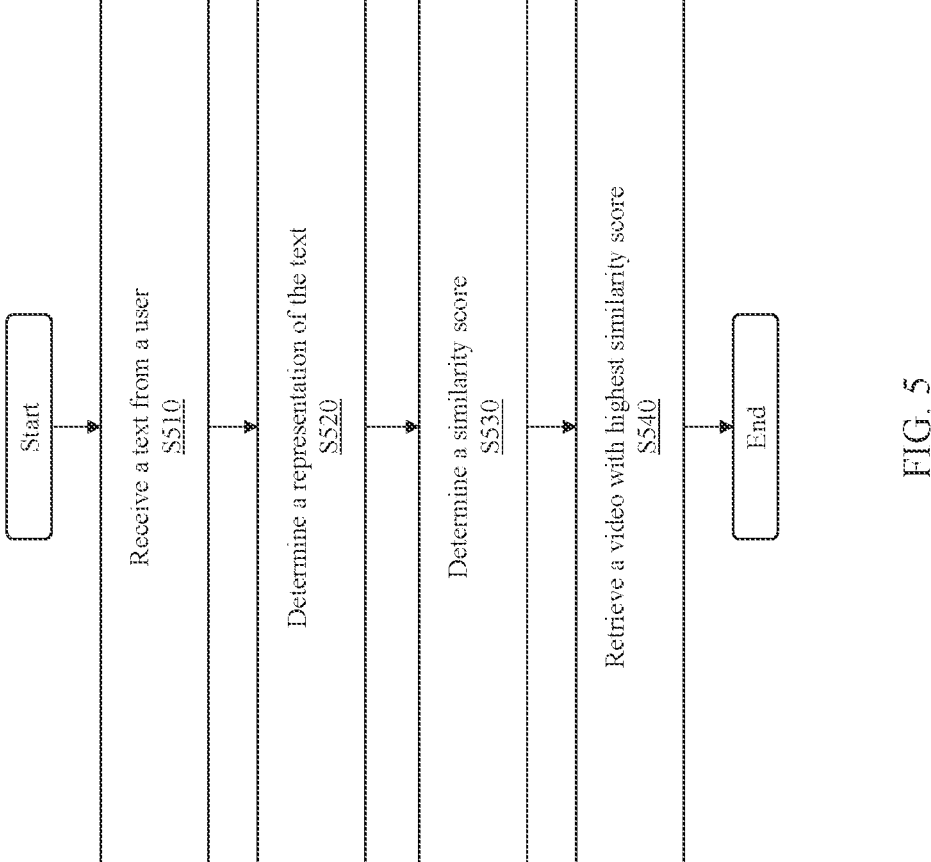
FIG. 5 illustrates a flow diagram of an example method for video retrieval, according to one or more embodiments.

FIG. 5 illustrates a flow diagram of another example method 500 for video retrieval, according to one or more embodiments. One or more operations in method 500 may be performed by at least one processor (e.g., processor 120) of the VR system.

As illustrated in FIG. 5, at operation S510, the at least one processor may be configured to receive a text from a user. According to embodiments, the text may include a query. According to embodiments, the text may include a natural language query. For example, the text may include "find a video where my dog is running in a park".

At operation S520, the at least one processor may be configured to determine a representation of the text. According to embodiments, the at least one processor may be configured to determine the representation of the text by utilizing a text encoder (e.g., one or more of the text encoder modules 250 and 350 discussed above).

At operation S530, the at least one processor may be configured to determine a similarity score between the determined representation of the text and the stored representation of the video. According to embodiments, the stored representation of the video may refer to the representation of the video that is stored in the memory of the VR system during operation S440 in method 400. According to embodiments, the at least one processor may be configured to determine a similarity score between the determined representation of the text and each of the representation of the videos stored in the memory. According to embodiments, the similarity score may be determined by utilizing nearest neighbor search method.

At operation S540, the at least one processor may be configured to retrieve a video with highest similarity score. According to embodiments, the at least one processor may be configured to compare the similarity scores for the representation of the videos with each other, and determine which representation of the video has the highest similarity score in relation to the representation of the received text. Subsequently, the at least one processor may retrieve the video corresponding to the representation of the video that has the highest score. As such, the video that is most relevant to the received text may be retrieved for the user.

Upon performing operation S540, the method 500 may be ended or be terminated. In some embodiments, the method 500 may return to operation S510, such that the at least one processor may be configured to repeatedly perform, for at least a predetermined amount of time, the receiving the text (at operation S510), the determining the representation (at operation S520), the determining the similarity score (at operation S530), and the retrieving the video (at operation S540). For example, the at least one processor may continuously (or periodically) receive texts from the user, and then restart the receiving the text (at operation S510), the determining the representation (at operation S520), the determining the similarity score (at operation S530), and the retrieving the video (at operation S540).

To this end, the system of the present disclosure may retrieve a video that best matches the text received from the user.

Figure 6:
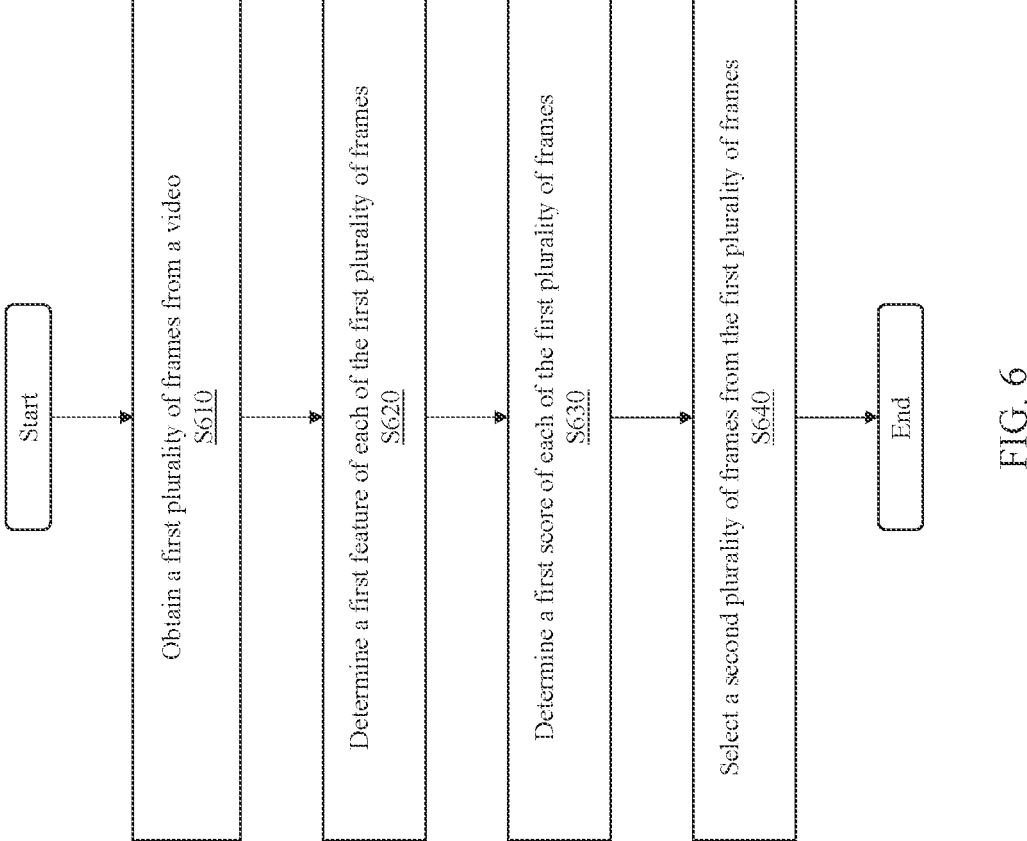
FIG. 6 illustrates a flow diagram of an example method for selecting a second plurality of frames from among a first plurality of frames, according to one or more embodiments.

FIG. 6 illustrates a flow diagram of an example method 600 for selecting a second plurality of frames from among a first plurality of frames, according to one or more embodiments. One or more operations of method 600 may be part of operations S410 and S420 in method 400, and may be performed by at least one processor (e.g., processor 120) of the VR system.

As illustrated in FIG. 6, at operation S610, the at least one processor may be configured to obtain a first plurality of frames from a video. It may be understood that a video may include, in total, an "x" number of frames. Accordingly, the at least one processor may be configured to obtain a first plurality of frames from the x number of frames of the video. According to embodiments, the first plurality of frames may comprise n number of frames, where n is less than x. For example, a video may have 20 frames in total (i.e., x is 20), and the at least one processor may be configured to obtain 4 frames (i.e., first plurality of frames where n is 4) from such 20 frames.

According to embodiments, the first plurality of frames may be obtained by uniformly obtaining a number of evenly spaced frames from the video. For example, the at least one processor may be configured to obtain 1 frame for every 5 frames from the video that has a total of 20 frames, such that the $1^{st}$ frame, $6^{th}$ frame, $11^{th}$ frame, and $16^{th}$ frames are obtained and correspond to the first plurality of frames.

According to embodiments, the first plurality of frames may be obtained by a feature extractor module of the VR system (e.g., one or more of the feature extractor modules 210 and 310 discussed above).

At operation S620, the at least one processor may be configured to determine a first feature of each of the first plurality of frames. It may be understood that a feature of a frame may include an embedding, a representation, and the like, which may be a set of data that capture important information of the frame. For example, a feature of a frame may include a set of data that corresponds to a visual feature that is representative of such frame.

According to embodiments, the first feature may be determined for each of the first plurality of frames by utilizing a neural network model (e.g., a neural network model included in one or more of the feature extractor modules 210 and 310 discussed above). According to embodiments, the neural network model may be frozen, such that weights of a neural network layer are prevented from being modified during a backward pass of training. According to embodiments, the neural network model may include a lightweight Convolutional Neural Network (CNN) neural network model. For example, the first feature may be determined for each of the first plurality of frames by utilizing a MobileNet model.

According to embodiments, the first feature may be determined by a feature extractor module of the VR system (e.g., one or more of the feature extractor modules 210 and 310 discussed above).

At operation S630, the at least one processor may be configured to determine a first score of each of the first plurality of frames. According to embodiments, the first score of each of the first plurality of frames may be determined based on the first feature of the corresponding one of the first plurality of frames. According to embodiments, the first score may represent an importance of a frame. For example, a feature of a frame may indicate that said frame is clearly showing a person performing an action, which shows important elements that can be used to represent the video. Thus, said frame may receive a high score. On the other hand, a feature of a frame may indicate that said frame is blurry, empty, or the like and does not show important elements that can be used to represent the video. Thus, said frame may receive a low score.

According to embodiments, the first score may be determined by utilizing one or more of positional encoding, one layer transformation block, linear layer, and softmax. For example, positional encoding may be added to each features in order to provide the relative positions/order of the frames in a sequence. The one layer transformation block may then be utilized in order to perform self attention between the frames, such that information regarding the relationship between the current frame and other frames can be obtained. Once the relationship information is obtained, the linear layer and softmax may be utilized to generate the score for each of the frames.

According to embodiments, the first score may be determined by a frame selection module of the VR system (e.g., one or more of the frame selection modules 220 and 320 discussed above).

At operation S640, the at least one processor may be configured to select a second plurality of frames from the first plurality of frames. According to embodiments, the second plurality of frames may include k number of frames, where k is less than n. For example, the first plurality of frames may include 4 frames (i.e., n is 4), and the at least one processor may be configured to select 2 frames (i.e., second plurality of frames where k is 2) from the 4 frames.

According to embodiments, the number k may be selected and adjusted. According to embodiments, the number k may be selected based on at least one from among a user input and an amount of computational resources available, for example at least one of an amount of computational resources available for the frame selection module, and an amount of computational resources available for the system. According to embodiments, the amount of computational resources available may be the amount of computational resources available at a certain time. For example, based on a determination that the amount of computational resources available at the current time is high, the user may select the number k to be high in order to fully utilize the available computational resource at the current time.

According to embodiments, the second plurality of frames may be selected based on the first score. According to embodiments, the second plurality of frames may be selected based on the first score using a mask. According to embodiments, the mask may include a function which removes (or masks) a selected frame such that the selected frame is prevented from being re-selected when selecting the second plurality of frames.

According to embodiments, the second plurality of frames may be selected by a frame selection module of the VR system (e.g., one or more of the frame selection modules 220 and 320 discussed above). According to embodiments, the frame selection module may be end-to-end differentiable. In particular, the frame selection module may select the second plurality of frames by calculating a tensor having a shape of [b, k, n], where b represents a batch size, k represents the number of the second plurality of frames, and n represents the number of the first plurality of frames. In some embodiments, the frame selection module may return discrete indices indicating the second plurality of frames, instead of simply providing an output which is a mix of the first plurality of frames. Accordingly, this indexing of the second plurality of frames may allow the frame selection module to be trained and/or optimized together with a multimodal video retrieval model based on retrieval loss through backpropagation. Further, the frame selection module can be applied to other machine learning tasks, such as video summarization, video highlight detection, and the like.

Figure 7:
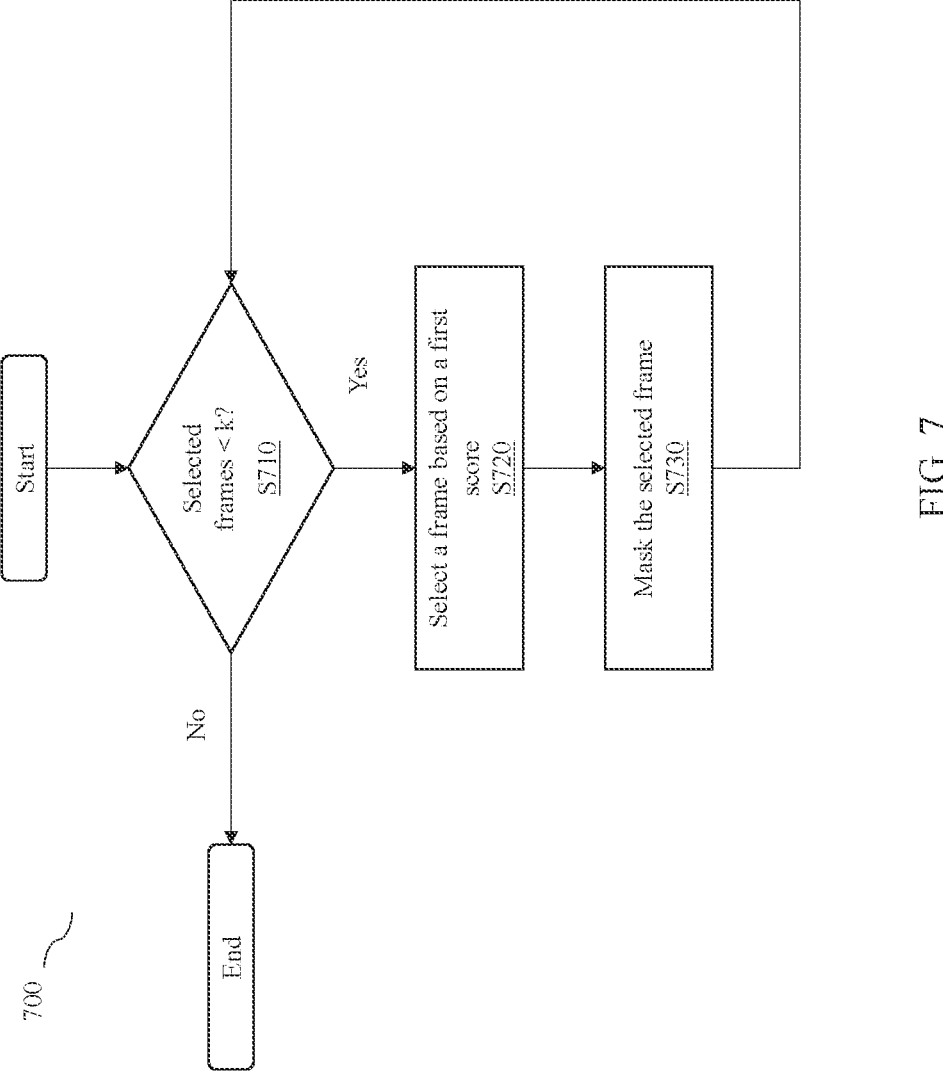
FIG. 7 illustrates a flow diagram of an example method for selecting a second plurality of frames from a first plurality of frames based on a first score using a mask, according to one or more embodiments.

FIG. 7 illustrates a flow diagram of an example method 700 for selecting the second plurality of frames from the first plurality of frames based on the first score using the mask, according to one or more embodiments. One or more operations of method 700 may be part of operation S640 in method 600, and may be performed by at least one processor (e.g., processor 120) of the VR system.

As illustrated in FIG. 7, at operation S710, the at least one processor may be configured to determine whether the number of currently selected frame is less than the number k of the second plurality of frames. It may be understood that the number k may be selected based on at least one from among a user input and an amount of resources available for the system as described above.

Accordingly, based on determining that the number of currently selected frame is less than the number k, the at least one processor may determine that more frames can be selected for the second plurality of frames and the method proceeds to operation S720. However, based on determining that the number of currently selected frame is not less than the number k (i.e., the number of currently selected frames is equal to or greater than the number k), the at least one processor may determine that no more frames can be selected for the second plurality of frames and the method proceeds to end.

At operation S720, the at least one processor may be configured to select a frame from the first plurality of frames based on the first score. According to embodiments, each of the first plurality of frames may have a selection likelihood. According to embodiments, the selection likelihood may include a likelihood for a frame to be selected. According to embodiments, the selection likelihood of each of the first plurality of frames may be proportional to the first score of the corresponding one of the first plurality of frames. According to embodiments, the frame (i.e., second plurality of frames) may be selected based on a probability distribution and the selection likelihood. According to embodiments, the probability distribution may include a multinomial distribution. For example, softmax and multinomial distribution may be utilized such that frames with high first score have a higher probability of being selected, while frames with low first score have a lower probability of being selected, and the at least one processor may be configured to select a frame from the first plurality of frames based on such probability in accordance with the multinomial distribution.

At operation S730, the at least one processor may be configured to mask the selected frame such that the selected frame is prevented from being re-selected. According to embodiments, the at least one processor may be configured to mask the selected frame using a mask.

The method then returns to operation S710, and repeats operations S710, S720, and S730 until the number of selected frame is equal to the number k (i.e., until k frames are selected).

It may be understood that, since the selected frame is prevented from being re-selected using the mask, the number k (i.e., the number of frames to be selected) can be freely selected and adjusted. In this regard, because the above processes may allow for the number of frames to be reduced from n frames to k frames, and because k can be freely adjusted, the above processes allow for the VR system to be flexible and adaptable for use in different kinds of devices with varying available computational resource at different times. For example, when the VR system is to be utilized in a device which has a large amount of available computational resources, the number k can be adjusted to a large number, such that a better representation of the video can be obtained. In contrast, when the VR system is to be utilized in a device which has a small amount of available computational resources, the number k can be adjusted to a small number, such that the best representation of the video can be obtained with the available computational resource. As a further example, when the VR system is to be utilized in a device which has a varying amount of available computational resources at different times, the number k can be adjusted in accordance with the available computational resource at that time.

Figure 8:
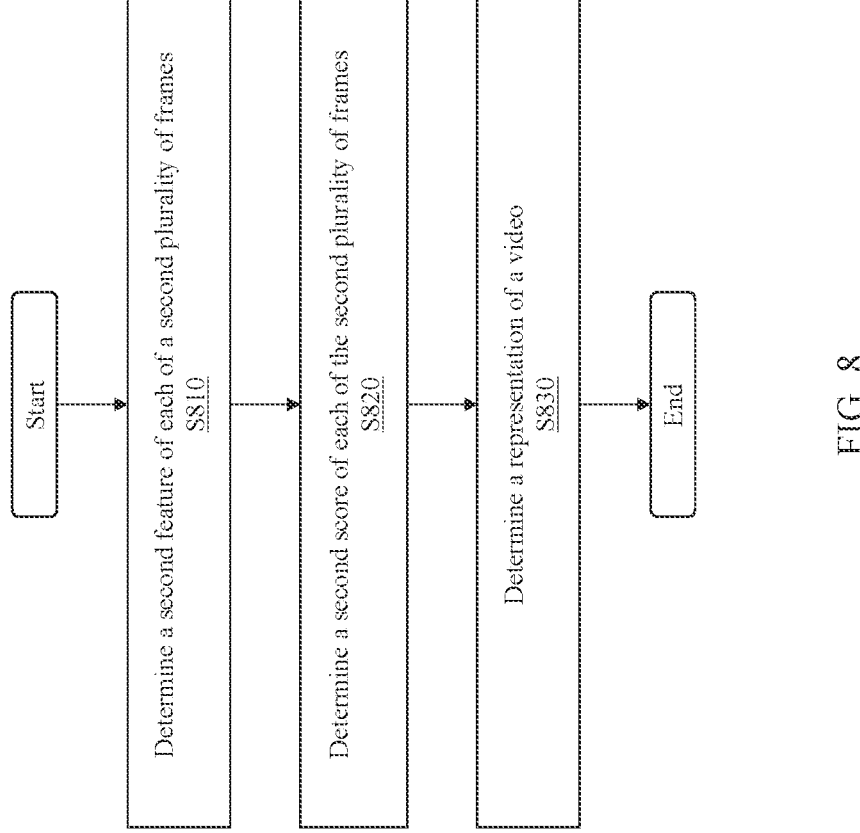
FIG. 8 illustrates a flow diagram of an example method for determining a representation of a video, according to one or more embodiments.

FIG. 8 illustrates a flow diagram of an example method 800 for determining the representation of a video, according to one or more embodiments. One or more operations of method 800 may be part of operation S430 in method 400, and may be performed by at least one processor (e.g., processor 120) of the VR system.

As illustrated in FIG. 8, at operation S810, the at least one processor may be configured to determine a second feature of each of the second plurality of frames. According to embodiments, the second feature may be determined for each of the second plurality of frames by utilizing an encoder (e.g., one or more of the image encoder modules 230 and 330 discussed above). According to embodiments, the encoder may include an encoder that has a higher performance and is more computationally intensive in comparison to the neural network model utilized during operation S620 in method 600, such that features extracted by the encoder (e.g., the second feature) capture more fine-grained semantics (e.g., better representative of the frame) in comparison to features extracted by the neural network model utilized during operation S620 in method 600 (e.g., the first feature). According to embodiments, the encoder may include a Pre-Trained Contrastive Language-Image Pre-training (CLIP) Image Encoder.

According to embodiments, the second feature may be determined by an image encoder module of the VR system. The method then proceeds to operation S820.

At operation S820, the at least one processor may be configured to determine a second score of each of the second plurality of frames. According to embodiments, the second score of each of the second plurality of frames may be determined based on the second feature of the corresponding one of the second plurality of frames. According to embodiments, the second score may represent an importance of a frame. According to embodiments, the second score of each of the second plurality of frames may be determined based on the second feature of the corresponding one of the second plurality of frames using a neural network model (e.g., a neural network model included in one or more of the frame aggregation modules 330 and 340 discussed above). According to embodiments, the neural network may be lightweight. According to embodiments, the neural network model may include a multilayer perceptron (MLP) neural network model.

Figure 9:
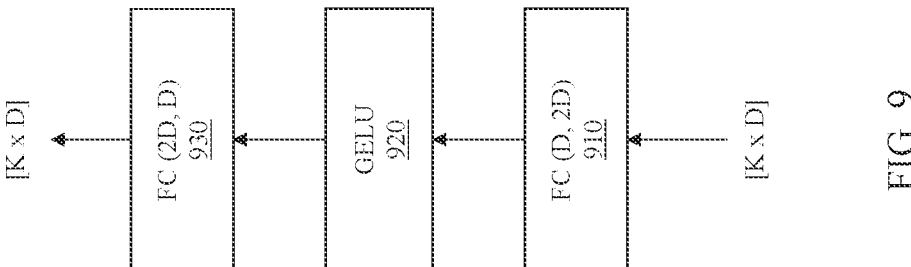
FIG. 9 illustrates an example architecture of a multilayer perceptron (MLP) neural network model, according to one or more embodiments.
Figure 9:

FIG. 9 illustrates an example architecture of an MLP 900, according to one or more embodiments. As illustrated in FIG. 9, the MLP 900 may include at least one first fully connected layer FC (D, 2D) 910, at least one Gaussian Error Linear Unit (GELU) activation function 920, and at least one second fully connected layer FC (2D, D) 930, although it can be understood that the MLP 900 may include more or less components than as illustrated in FIG. 9, and/or may be arranged in a manner different from as illustrated in FIG. 9, without departing from the scope of the present disclosure.

As illustrated in FIG. 9, the MLP 900 may receive an input of second features. According to embodiments, the second features may be in the shape of [K×D], where K represents the number of the second features and D represents the dimension.

The second features may first be inputted into the first fully connected layer FC (D, 2D) 910, which may be configured to expand the D dimension into a 2D dimension and transform the shape [K×D] into [K×2D].

The transformed shape [K×2D] of the second features may then be inputted into the GELU activation function 920, which may be configured to transform the second features.

Once the second features are transformed, the transformed shape [K×2D] of the second features may then be inputted into the second fully connected layer FC (2D, D) 930, which may be configured to contract the 2D dimension back into the D dimension and transform the shape [K×D] back into [K×D].

Accordingly, it may be understood that the above configuration allows for the input to be transformed into a 2D dimension for inputting to the GELU activation function 920, and then be transformed back into a D dimension, such that the input and output of the MLP 900 can maintain the same dimension. Further, the above configuration allows for the frame aggregation module to transform the second features while being lightweight.

In some embodiments, the transformed second features may then be scored and weighed. In some embodiments, the output of the MLP 900 may be provided to other elements, for example a linear layer and softmax layer, which may be used to generate scores, for example the second score discussed above. These scores may then be used to weigh the second features.

According to embodiments, the second score may be determined by a feature aggregation module of the VR system (e.g., a neural network model included in one or more of the frame aggregation modules 330 and 340 discussed above).

Returning to FIG. 8, at operation S830, the at least one processor may be configured to determine a representation of the video. According to embodiments, the at least one processor may be configured to determine a representation of the video based on the second score.

According to embodiments, the second feature of each of the plurality of second frames may have a weight proportional to the second score of the corresponding one of the second plurality of frames. According to embodiments, the at least one processor may be configured to determine a representation of the video by determining a weighted mean of the second features of the plurality of second frames, such that the second features with higher weights contribute to forming the representation more in comparison to the second features with lower weights.

It may be understood that, because the second features may be weighted based on the corresponding second scores that are determined using a neural network model, and because the representation of the video may be determined by determining a weighted mean of the second features (where the second features with higher weights (more important) contribute to forming the representation more in comparison to the second features with lower weights (less important)), the resulting representation of the video may be more relevant and accurate to the content of the video, which improves performance. As such, even if a large number is selected for k due to usage of high performance device with a large amount of available computational resources, and the system selects a large amount of less important frames (which will be used to form the representation of the video), the system will be able to down-weight such less important frames and reduce the effects and influences of such frames on the resulting representation of the video, thereby improving performance.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s) module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A method comprising:
obtaining a first plurality of frames of a video;
selecting a second plurality of frames from among the first plurality of frames using a frame selection module based on a plurality of first features extracted from the first plurality of frames, wherein a number of the second plurality of frames is less than a number of the first plurality of frames;
extracting a plurality of second features from the second plurality of frames;
generating a plurality of weights corresponding to the second plurality of frames using a neural network model;
generating a representation of the video by calculating a weighted mean based on the plurality of weights and the plurality of second features; and
storing the representation of the video in a memory.

2. The method according to claim 1, wherein the number of the second plurality of frames is selected based on at least one from among a user input and an amount of resources available.

3. The method of claim 1, wherein the frame selection module comprises at least one neural network model, and wherein the frame selection module is end-to-end differentiable.

4. The method according to claim 1, wherein the second plurality of frames are selected using a mask, and wherein the mask comprises a function that is configured to prevent a selected frame from being re-selected when selecting the second plurality of frames.

5. The method according to claim 1, wherein the neural network model comprises a multilayer perceptron (MLP) neural network model.

6. The method according to claim 1, wherein the selecting the second plurality of frames comprises calculating a tensor having a shape of [b, k, n],
where b represents a batch size, k represents the number of the second plurality of frames, and n represents the number of the first plurality of frames.

7. The method according to claim 1, wherein the selecting the second plurality of frames comprises:
determining a first feature of each of the first plurality of frames;
determining a first score of each of the first plurality of frames based on the first feature; and
selecting the second plurality of frames from the first plurality of frames based on the first score using a mask.

8. The method according to claim 7, wherein each of the first plurality of frames has a selection likelihood which is proportional to the first score, and
wherein the second plurality of frames is selected based on a multinomial distribution and the selection likelihood.

9. The method according to claim 1, wherein the determining the representation of the video comprises:
determining a second feature of each of the second plurality of frames;

determining a second score of each of the second plurality of frames based on the second feature using the neural network model; and determining the representation of the video based on the second score.

10. The method according to claim 9, wherein the second feature has a weight proportional to the second score.

11. The method according to claim 1, further comprising:

receiving a request from a user to retrieve a video related to a text provided by the user;

determining a representation of the text;

for each of a plurality of videos stored in the memory, determining a similarity score between the video and the representation of the text; and retrieving a video with a highest similarity score to present to the user.

12. A system comprising:

a memory storage storing computer-executable instructions; and at least one processor communicatively coupled to the memory storage, wherein the at least one processor is configured to execute the instructions to:

obtain a first plurality of frames of a video;

select a second plurality of frames from among the first plurality of frames using a frame selection module based on a plurality of first features extracted from the first plurality of frames, wherein a number of the second plurality of frames is less than a number of the first plurality of frames;

extract a plurality of second features from the second plurality of frames;

generate a plurality of weights corresponding to the selected second plurality of frames using a neural network model;

generate a representation of the video by calculating a weighted mean based on the plurality of weights and the plurality of second features; and store the representation of the video in the memory.

13. The system according to claim 12, wherein the number of the second plurality of frames is selected based on at least one from among a user input and an amount of resources available for the system.

14. The system of claim 12, wherein the frame selection module comprises at least one neural network model, and wherein the frame selection module is end-to-end differentiable.

15. The system according to claim 12, wherein the second plurality of frames are selected using a mask, and wherein the mask comprises a function that is configured to prevent a selected frame from being re-selected when selecting the second plurality of frames.

16. The system according to claim 12, wherein the neural network model comprises a multilayer perceptron (MLP) neural network model.

17. The system according to claim 12, wherein the at least one processor is configured to execute the instructions to select the second plurality of frames by:

determining a first feature of each of the first plurality of frames;

determining a first score of each of the first plurality of frames based on the first feature; and selecting the second plurality of frames from the first plurality of frames based on the first score using a mask.

18. The system according to claim 12, wherein the at least one processor is configured to execute the instructions to determine the representation of the video by:

determining a second feature of each of the second plurality of frames;

determining a second score of each of the second plurality of frames based on the second feature using the neural network model; and determining the representation of the video based on the second score.

19. The system according to claim 18, wherein the second feature has a weight proportional to the second score.

20. A non-transitory computer-readable recording medium having recorded thereon instructions executable by at least one processor to cause the at least one processor to perform a method comprising:

obtaining a first plurality of frames of a video;

selecting a second plurality of frames from among the first plurality of frames using a frame selection module, wherein a number of the second plurality of frames is less than a number of the first plurality of frames;

generating a plurality of weights corresponding to the selected second plurality of frames using a neural network model;

generating a representation of the video by calculating a weighted mean based on the plurality of weights and the plurality of second features; and storing the representation of the video in a memory.

* * * * *